Patented Feb. 27, 1940

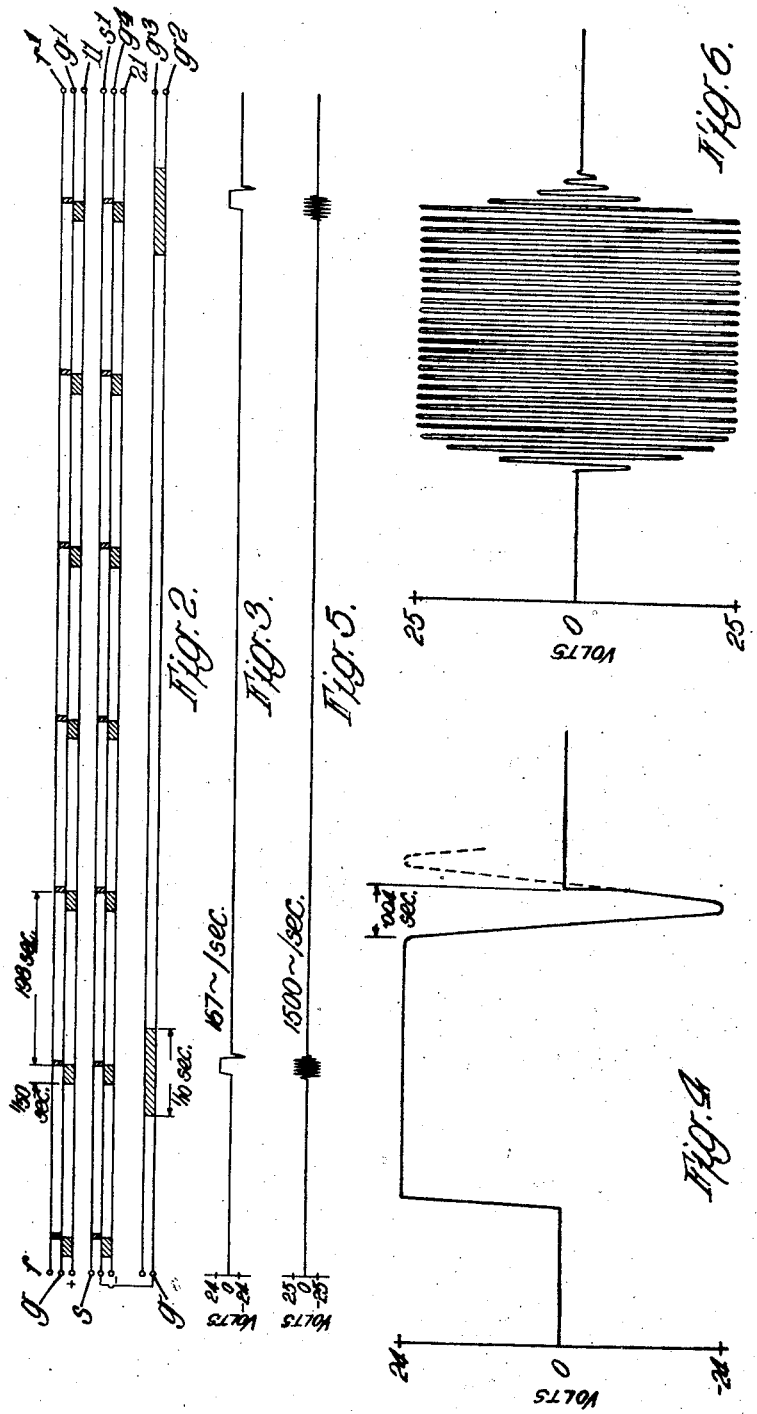

2,191,809

UNITED STATES PATENT OFFICE 2,191,809

DYNAMO ELECTRIC MACHINERY

Donald Orr Sproule, London, England, assignor of one-third to Arthur Joseph Hughes, Essex, England, and one-third to Henry Hughes & Son Limited, London, England, a British limited liability company Application March 21, 1939, Serial No. 263,153
In Great Britain March 16, 1938

5 Claims. (Cl. 171—209)

This invention relates to improvements in dynamo electric machinery and has for its object to provide means whereby the efficiency of impulse generators can be increased, the risk of damage to contacts in associated inductive circuits be reduced and the sharpness of cut-off of each individual pulse be accentuated in a simple and inexpensive manner.

The generation of powerful electrical pulses of short time duration in the output circuit of a generator, the rotor of which has been allowed to acquire momentum and has extracted electrical energy from a supply source for a comparatively greater period of time and stored it as kinetic energy is known; in some cases the output circuit has been connected momentarily to the generator and in other cases the field circuit has been energised momentarily thus eliminating iron losses in the absence of output but introducing difficulties with contacts due to the voltage surge consequent upon the breaking of the field circuit.

This invention consists in an improved electrical impulse generator and is characterised in that the field of the generator is alternately magnetised by a periodically interrupted direct current and demagnetised by an alternating current pulse which is substituted for the direct current when the voltages of the two currents are substantially identical, the flow of said alternating current being interrupted when the current in the field winding is zero.

Further the invention is characterised in that on the interruption of the supply of direct current to the field of the generator the energy in said field and in the field of associated devices in the output circuit of the generator is neutralised by the demagnetising effect of an alternating current applied to the field winding.

In the drawings:

Figure 2 is a diagram showing by way of example a sequence and time periods of operation of the various switches.

Figure 1:
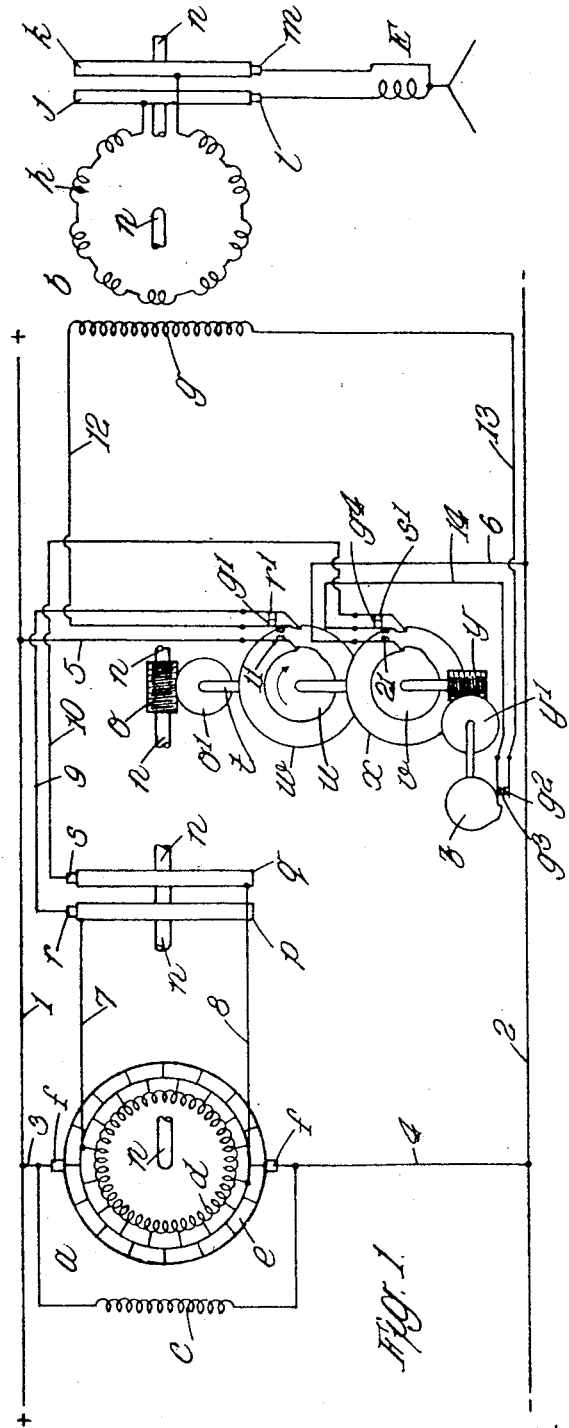
Figure 1 is a diagram showing one arrangement of the circuits and switches of an impulse generator according to this invention.

Figure 3 is a diagram showing the changes in voltage across the generator field winding with the switches arranged according to Figure 2, Figure 4 is a diagram showing the field voltage change in Figure 3 drawn to a larger scale, Figure 5 is a diagram companion with Figure 3 and showing the output voltage of the generator, and Figure 6 is a diagram showing the pulse of Figure 5 drawn to a larger scale.

In Figure 1 $a$ diagrammatically represents a shunt wound direct current electromotor and $b$ an alternating current generator.

The electromotor $a$ comprises a field magnet winding $c$, an armature winding $d$, a commutator $e$ and brushes $f$, $f$ whilst the generator $b$ comprises a field winding $g$, an inductive winding $h$, and slip rings $j$ and $k$ cooperating with brushes $l$ and $m$ respectively.

The windings $d$ and $h$ the commutator $e$ and slip rings $j$ and $k$ are mounted on a spindle $n$ which also is provided with slip rings $p$ and $q$ cooperating with brushes $r$ and $s$ respectively and with a worm $o$.

The worm $o$ engages a worm wheel $o^1$ mounted on a shaft $t$ carrying four switch cams $u$, $v$, $w$ and $x$ and a worm $y$ which engages a worm wheel $y^1$ carrying a switch cam $z$.

The positive $1$ and negative $2$ of the direct current mains respectively are connected by the conductors $3$ and $4$ to the brushes $f$, $f$ and to the winding $c$ in shunt therewith in the usual way, the positive $1$ also being connected by the conductor $5$ to the contact blade $11$ operated by the cam $u$ whilst the negative $2$ also is connected by the conductor $6$ to the contact blade $21$ operated by the cam $v$.

Diametrically opposite points in the armature winding $d$ are connected by the conductors $7$ and $8$ to the slip rings $p$ and $q$ respectively and the brush $r$ is connected by the conductor $9$ to the contact blade $r^1$ operated by the cam $w$ whilst the brush $s$ is connected by the conductor $10$ to the contact blade $s^1$.

A contact $g^1$ is arranged between the contact blades $11$ and $r^1$ and is connected by the conductor $12$ to one end of the field winding $g$ the other end of which is connected by the conductor $13$ to the contact blade $g^2$ adapted to cooperate with the contact blade $g^3$ operated by the cam $z$, said blade $g^3$ being connected by the conductor $14$ to the contact $g^4$ arranged between the contact blades $21$ and $s^1$.

The direct current, beside energising the motor $a$ to rotate the shaft $n$ and the parts $p$, $q$, $o$, $h$, $j$ and $k$ mounted thereon, flows from the positive $1$ of the mains through the conductor $5$ to the contact blade $11$ and from thence, when raised by the cam $u$, to the contact blade $g^1$ through the conductor $12$, field winding $g$ and conductor $13$ to the contact blade $g^2$, contact being effected with the blade $g^3$, when raised by the cam $z$, to complete the circuit through the conductor 14, the contact blade $g^4$, the contact blade 21 (when raised by the cam $v$) and the conductor 6 to the negative 2 of the mains.

The slip rings $p$ and $q$ being connected to diametrically opposite points of the armature winding $d$ will have applied thereto an alternating voltage of a maximum potential equal to the potential of the direct current. This alternating current will pass from the brush $r$ through the conductor 9 to the contact blade $r^1$ and through the contact blade $g^1$, when the blade $r^1$ is allowed to fall by the cam $w$, the conductor 12, the winding $g$ and the conductor 13 to the contact blade $g^2$, thence through the contact blade $g^3$, when it is raised by the cam $z$, the conductor 14, the contact blade $g^4$, the contact blade $s^1$, when it is allowed to fall by the cam $x$, and the conductor 10 to the brush $s$.

The cams $u$, $v$, $w$, $x$ are so shaped and timed relatively to one another that during the formation of an impulse the cams $u$ and $v$ raise the blades 11 and 21 until they contact with the blades $g^1$ and $g^4$ respectively, thus connecting the winding $g$ to the mains 1 and 2, if the blades $g^2$ and $g^3$ are in contact.

The cams $w$ and $x$ are so set in relation to the rotation of the slip rings $p$ and $q$ that the said cams allow the blades $r^1$ and $s^1$ to fall and contact with the blades $g^1$ and $g^4$ when the voltage at the brushes $r$ and $s$ is at its maximum, i. e., equal to the mains voltage; instantaneously the blades 11, $g^1$ and $r^1$ are in contact with one another but as the blades are all at the same potential no burning or arcing takes place, which condition also applies to the blades 21, $g^4$ and $s^1$ which are in contact with one another at the same time.

After a brief space of time the cams $u$ and $v$ allow the blades 11 and 21 to break contact with the blades $g^1$ and $g^4$ but the contact between the blades $g^1$ and $r^1$ and between the blades $g^4$ and $s^1$ is maintained until the potential applied to the brushes $r$ and $s$ has been reversed a sufficiently long time to reduce the current in the winding $g$ to zero, thus producing the voltage change in this winding as shown in Figure 4.

From Figure 3 it will be seen that the voltage changes are separated by periods of no voltage, the spacing being effected by the cam $z$ and contact blades $g^3$ and $g^2$.

Any kind of gearing may be used to obtain the required velocity ratio and the invention is not limited to worm gearing as shown in Figure 1.

When the output from the generator is to be applied to a sound emitter such as E in Figure 1 having a field inductance of about .011 henry, the inductance of the field winding $g$ in parallel therewith is about .018 henry and the mains voltage is about 24, it is found to be possible to deliver about 440 watts to the transmitter E for about one-fiftieth part of a second with an average input of about 118 watts from the direct current mains to the motor $a$ rotating at about 10,000 revolutions per minute.

Figure 2 shows the sequence of operation of the switches, the contact periods being indicated by hatched areas and as this figure is coordinated with Figure 3 the formation of the voltage pulses is displayed clearly.

In Figure 2 the top group of three lines represents the triple blade switch operated by the cams $u$ and $w$, the next group of three lines represent the triple blade switch operated by the cam $v$ and $x$ and the lower group of two lines represent the switch operated by the cam $z$.

To facilitate the understanding of the example described, the use of a time scale has been avoided in the drawings, the important time periods having been applied to Figures 2 and 4. As shown about 167 pulses are generated in each second, the velocity ratio of the worm $o$ and wheel $o^1$ being 33:1 and the velocity ratio of the worm $y$ and wheel $y^1$ being 5:1.

Figure 5 is coordinated with Figures 2 and 3 and indicates the voltage output pictorially as the periodicity is about 1,500 per second which cannot be shown to scale.

The purpose of the switch $g^2$ $g^3$ is more or less evident from the description inasmuch as it will be seen that by its use it is possible to secure relatively long periods between the pulses even when the shaft $n$ rotates at a comparatively high speed thus reducing the precision required during the machining and the setting of the cams $u$, $v$, $w$ and $x$, but obviously this switch is unnecessary in some cases and may be omitted.

I claim:

1. An electrical impulse generator comprising a revoluble inductive winding, means to revolve said inductive winding, means to derive from said inductive winding current impulses generated therein, a field winding, a circuit for said field winding, a source of direct current, a source of alternating current of a maximum potential equal to the potential of said direct current, first switch means for connecting said source of direct current to said field winding circuit, second switch means for connecting said source of alternating current to said field winding circuit, and control mechanism coupled to said driving means for periodically actuating said first and second switch means in a predetermined rhythm so as to first close said first switch means thereby magnetizing said field winding, then after a predetermined interval close said second switch means at the moment when the alternating current is at its maximum while the first switch means is still closed, then open said first switch means, and finally open said second switch means when the alternating current is at zero and the field winding has become demagnetized.

2. An electrical impulse generator comprising a revoluble conductive winding, means to revolve said inductive winding including a direct current electromotor having an armature winding, means to derive from said inductive winding current impulses generated therein, a field winding associated with said inductive winding, a circuit for said field winding, a source of direct current connected to said motor to supply energy thereto, means for obtaining from the armature winding of said motor an alternating current of a maximum potential equal to the potential of said direct current, first switch means for connecting said source of direct current to said field winding circuit, second switch means for connecting said means for obtaining alternating current to said field winding circuit, and control mechanism mechanically coupled to said electromotor for periodically actuating said first and second switch means in a predetermined rhythm so as to first close said first switch means thereby magnetizing said field winding, then after a predetermined interval close said second switch means at the moment when the alternating current is at its maximum while the first switch means is still closed, then open said first switch means, and finally open said second switch means when the alternating current is at zero and the field winding has become demagnetized.

3. An electrical impulse generator, as claimed in claim 2, in which said control mechanism for said switch means comprises a cam shaft driven by said electromotor and carrying groups of cams shaped to actuate the individual switches at the proper moments.

4. An electrical impulse generator, as claimed in claim 2, in which said means of obtaining a suitable alternating current from the armature winding of said electromotor comprises two slip rings movable with the armature winding and electrically connected to diametrically opposite points of the latter, and brushes resiliently pressed against said slip rings to collect the alternating current applied to the latter.

5. An electrical impulse generator, as claimed in claim 2, comprising an auxiliary switch in said field winding circuit, and means driven by said electromotor to close said switch at predetermined intervals.

DONALD ORR SPROULE.